United States Patent
Drooghaag et al.

(10) Patent No.: US 8,891,736 B2
(45) Date of Patent: Nov. 18, 2014

(54) METHOD AND DEVICE FOR CLUSTERING LINES OF A WIRELINE NETWORK IN A NUMBER OF VIRTUAL BINDERS

(75) Inventors: Benoit Drooghaag, Ophain-Bois-Seigneur-Isaac (BE); Nicolas Dupuis, Chaudfontaine (BE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/639,019

(22) PCT Filed: Apr. 26, 2011

(86) PCT No.: PCT/EP2011/056521
§ 371 (c)(1),
(2), (4) Date: Oct. 31, 2012

(87) PCT Pub. No.: WO2011/134927
PCT Pub. Date: Nov. 3, 2011

(65) Prior Publication Data
US 2013/0051536 A1 Feb. 28, 2013

(30) Foreign Application Priority Data
Apr. 26, 2011 (EP) .................................. 10305465

(51) Int. Cl.
H04M 1/24 (2006.01)
H04M 3/08 (2006.01)
H04M 3/22 (2006.01)
H04B 3/46 (2006.01)
H04M 3/30 (2006.01)
H04M 3/34 (2006.01)

(52) U.S. Cl.
CPC ............. *H04B 3/464* (2013.01); *H04M 3/34* (2013.01); *H04M 3/306* (2013.01)
USPC .................. 379/1.04; 379/22.08; 379/24

(58) Field of Classification Search
USPC ............. 379/1.03, 1.04, 22.08, 23, 24, 27.08
See application file for complete search history.

(56) References Cited

U.S. PATENT DOCUMENTS

| | | | |
|---|---|---|---|
| 6,625,255 B1* | 9/2003 | Green et al. ............... | 379/1.04 |
| 6,914,961 B2* | 7/2005 | Holeva ...................... | 379/1.04 |
| 2006/0039456 A1* | 2/2006 | Bostoen et al. ............ | 375/222 |
| 2006/0098725 A1* | 5/2006 | Rhee et al. ................. | 375/222 |
| 2006/0159232 A1* | 7/2006 | Jiang et al. ................ | 379/1.03 |
| 2009/0207985 A1* | 8/2009 | Cioffi et al. ............... | 379/93.01 |

FOREIGN PATENT DOCUMENTS

EP 1630968 A1 3/2006
JP 2009-540671 11/2009

OTHER PUBLICATIONS

Raphael Cendrillon et al., "DSM from Theory to Practice." IEEE, 2008, pp. 1-4.
International Search Report PCT/ISA/210 for International Application No. PCT/EP2011/056521.
Office Action for Japanese Application No. 2013-506615 dated Nov. 26, 2013.

* cited by examiner

*Primary Examiner* — Quoc D Tran
(74) *Attorney, Agent, or Firm* — Harness, Dickey & Pierce

(57) ABSTRACT

A method and a device for clustering lines of a wireline network in a number of virtual binders includes obtaining a noise value samples pertaining to different lines of the wireline network at substantially coinciding sampling moments, detecting corresponding features in these series, determining degrees of correlation between these features, and assigning the lines to one or more virtual binders on the basis of their mutual degrees of correlation.

15 Claims, 3 Drawing Sheets

METHOD AND DEVICE FOR CLUSTERING LINES OF A WIRELINE NETWORK IN A NUMBER OF VIRTUAL BINDERS

FIELD OF INVENTION

The present invention relates to the detection of physical defects in lines of a wireline network, more particularly an xDSL-based access network. Accordingly, the present invention provides a method for clustering lines of a wireline network in a number of virtual binders, a device for performing such a method, and a system comprising such a device and an access node.

BACKGROUND

Triple-play technology allows offering services that require very high performance in terms of bit-rate and stability. When wireline infrastructure is used for data transmission, as is the case in xDSL-based access networks, attaining the required level of performance can become challenging, especially for longer loops. Moreover, in the presence of physical defects, the quality of service decreases drastically, and the quality of experience of the end user may become unacceptably low. In the case of IP TV, such a low quality of experience may present itself in the form of errors such as artifacts in the image and temporary freezing of the video stream. Hence, it is desirable for the network operator to have a way to adequately detect topological aspects and physical defects of the network, in order to be able to perform the necessary optimizations and/or maintenance interventions in a timely manner.

SUMMARY

Accordingly, it is an object of the present invention to provide a way to detect topological aspects and/or physical defects of a wireline network.

According to a first aspect of the present invention, there is provided a method for clustering lines of a wireline network in a number of virtual binders, the method comprising obtaining a first series of noise value samples pertaining to a first line of the wireline network and a second series of noise value samples pertaining to a second line of the wireline network, wherein noise value samples of the first series and noise value samples of the second series correspond to pairwise substantially synchronous sampling moments; detecting a target feature in the first series; detecting a candidate feature in the second series, the candidate feature substantially coinciding with the target feature in its temporal extent; determining a degree of correlation between the candidate feature and the target feature; and assigning the first line and the second line to a first virtual binder if the degree of correlation exceeds a predetermined threshold value, and assigning the first line and the second line to the first virtual binder and a second virtual binder, respectively, if the degree of correlation does not exceed the predetermined threshold value.

The invention is based inter alia on the insight that lines that react in a coherent way to external disturbers are likely to be strongly coupled. Such strong coupling may be the result of a common physical defect, or to particular topological properties. It is an advantage of the present invention that lines that react coherently to disturbers can be identified, and designated as being in the same virtual binder, without having to determine the crosstalk channels between the various lines, and without having to disrupt the service by transmitting dedicated test signals. The virtual binder represents a set of lines with a strong mutual coupling, which may be treated jointly for the purposes of certain network management or maintenance tasks. In addition, certain forms of transmission optimization which are based on coupling between different lines, such as transmit power coordination, crosstalk cancellation and vectoring, may advantageously be applied once a correct identification of coupled lines has been made.

The invention is also based inter alia on the insight that a noise value pertaining to the respective lines under detection provides an adequate metric for determining the degree of coupling between the lines. It is an advantage of the present invention that by observing trends of a scalar value, viz. a noise value, good results can be obtained with minimal computational complexity.

It shall be understood by the skilled person that the an adequate "degree of correlation" metric may be calculated in a variety of ways. Some metrics, not formally known as "correlation" in the field of mathematics or statistics, may be used in a fully equivalent way. Accordingly, if for instance a Euclidian distance between corresponding features is found to be below a certain distance threshold, this may be considered identical to finding a corresponding degree of correlation exceeding the corresponding correlation threshold value.

In an embodiment, the method of the present invention further comprises selecting the first line and the second line of the wireline network on the basis of the occurrence of substantially synchronous step transitions in the first series of noise value samples and the second series of noise value samples, wherein the step transitions have a magnitude exceeding a predetermined threshold magnitude.

It is an advantage of this embodiment that by performing a pre-selection on the basis of an easily detectable feature, the computational resources may be used more efficiently.

In an embodiment of the method of the present invention, the determining comprises correlating corresponding subsets of the first and the second series of noise value samples. In an embodiment of the method of the present invention, the determining comprises correlating corresponding series of first derivative values derived from the first and the second series of noise value samples.

It is an advantage of these embodiments that the correlation can be performed with high accuracy and limited complexity.

In an embodiment, the method of the present invention further comprises, for any additional line of the wireline network, obtaining an additional series of noise value samples pertaining to the additional line, wherein sampling times of noise value samples of the additional series substantially correspond to the sampling moments; detecting an additional feature in the additional series, the additional feature substantially coinciding with the target feature in its temporal extent; determining an additional degree of correlation between the additional feature and the target feature; assigning the additional line to the first virtual binder if the additional degree of correlation exceeds the predetermined threshold value.

This embodiment is based on the insight that the method of the present invention may be generalized to any number of lines, wherein each line may be assigned to the same virtual binder as the first line or not, based on the correlation of its noise value series features with the noise value series features of the first line.

In a particular embodiment, the method of the present invention further comprises determining a further degree of correlation between the additional feature and the candidate feature, and assigning the additional line to the second virtual binder if the further degree of correlation exceeds the predetermined threshold value. In a particular embodiment, the method of the present invention further comprises producing a distance matrix representing degrees of correlation between each of the first feature, the second feature, and the additional feature of the any additional line, wherein the assigning of the first line, the second line, and the any additional line to respective virtual binders is performed by applying a clustering algorithm to the distance matrix.

It is a further advantage of these embodiments that any number of lines may be divided into virtual clusters in an efficient way, by taking into account their various respective mutual correlations.

According to another aspect of the present invention, there is provided a device for clustering lines of a wireline network in a number of virtual binders, the device comprising receiving means configured to retrieve a first series of noise value samples pertaining to a first line among the number of lines and a second series of noise value samples pertaining to a second line among the number of lines; a feature extraction unit, operatively connected to the receiving means, the feature extraction unit being configured to detect a target feature in the first series and to detect a candidate feature in the second series; a correlation unit, operatively connected to the feature extraction unit, the correlation unit being configured to determine a degree of correlation between the candidate feature and the target feature; and a virtual binder assignment unit, configured to assign the first line and the second line to a first virtual binder if the degree of correlation exceeds a predetermined threshold value, and to assign the first line and the second line to the first virtual binder and a second virtual binder, respectively, if the degree of correlation does not exceed the predetermined threshold value.

Embodiments of the invention are further based on the insight that a device, such as a network analyzer, may advantageously be equipped with the necessary functions to carry out the method disclosed above. A network analyzer is particularly well suited to perform centralized computations on the basis of received noise information. It is an advantage of embodiments of the present invention that noise information may arrive at the network analyzer from distributed sources, such as different access nodes (e.g., DSLAMs) or dedicated measurement equipment. Hence, it will be possible to identify virtual binders comprising lines served by different access nodes, which nevertheless react coherently to external stimuli. As a result, joint optimizations may be applied to such lines across their respective access nodes. Such joint optimizations may include schemes known as distributed crosstalk cancellation and vectoring. The joint optimization may also consist in physically redistributing lines between access nodes to ensure that coupled lines are served by the same access node.

In an embodiment, the device of the present invention further comprises a selection unit, operatively connected to the receiving means, the selection unit being configured to select the first line and the second line from among the number of lines on the basis of the occurrence of substantially synchronous step transitions in the first series of noise value samples and the second series of noise value samples, wherein the step transitions have a magnitude exceeding a predetermined threshold magnitude.

In an embodiment of the device of the present invention, the correlation unit is configured to correlate corresponding subsets of the first and the second series of noise value samples.

In an embodiment of the device of the present invention, the correlation unit is configured to correlate corresponding series of first derivative values derived from the first and the second series of noise value samples.

In an embodiment of the device of the present invention, the receiving means is further configured to retrieve an additional series of noise value samples pertaining to an additional line, wherein sampling times of noise value samples of said additional series substantially correspond to said sampling moments; wherein said feature extraction unit is further configured to detect an additional feature in said additional series, said additional feature substantially coinciding with said target feature in its temporal extent; wherein said correlation unit is further configured to determine an additional degree of correlation between said additional feature and said target feature; and wherein said virtual binder assignment unit is further configured to assign said additional line to said first virtual binder if said additional degree of correlation exceeds said predetermined threshold value.

In a particular embodiment, the correlation unit is further configured to determine a further degree of correlation between the additional feature and the candidate feature; and the virtual binder assignment unit is further configured to assign the additional line to the second virtual binder if the further degree of correlation exceeds the predetermined threshold value.

The advantages of the device of the present invention and its various embodiments are those disclosed above for the corresponding methods.

According to another aspect of the present invention, there is provided a system comprising the device described above, connected to an access node, wherein the access node is connectable to the first line and the second line; the access node comprising a first noise measurement means configured to measure the first series of noise value samples pertaining to the first line, a second noise measurement means configured to measure a second series of noise value samples pertaining to the second line, and transmission means configured to transmit the first series of noise value samples and the second series of noise value samples to the device.

Embodiments of the present invention are based on the insight that access nodes are particularly advantageously positioned to measure or obtain the noise values used by the device of the present invention.

BRIEF DESCRIPTION OF THE FIGURES

Some embodiments of apparatus and/or methods in accordance with embodiments of the present invention are now described, by way of example only, and with reference to the accompanying drawings, in which.

DESCRIPTION OF EMBODIMENTS

Figure 1:
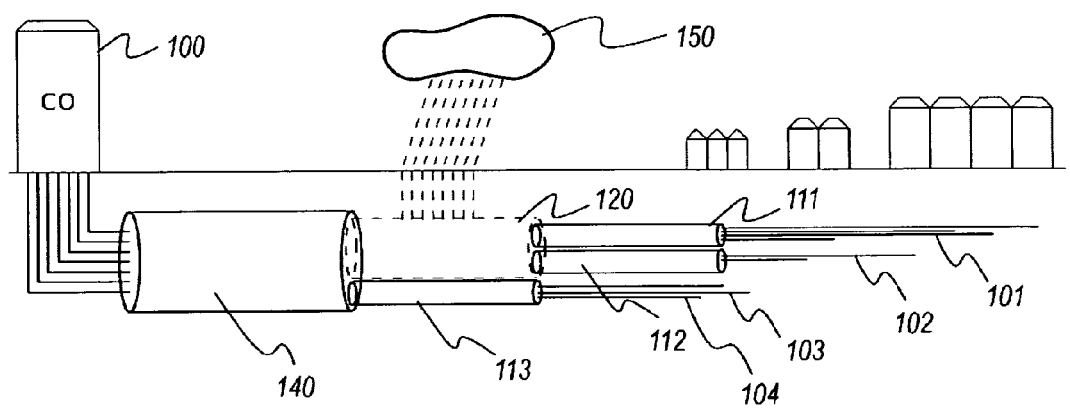
FIG. 1 illustrates a portion of a wireline network served by a central office.

The present invention allows efficient identification of groups of lines that respond coherently to changes in their physical conditions without interrupting their services. This, in turn, allows to operators to identify clusters of strongly coupled lines within bundles. Such information is useful in making assumptions about the quality of the physical link comprising the grouped lines, e.g. identification of damaged (for instance wet) binders, as illustrated in FIG. 1, presence of strong disturbers in the vicinity of a given binder, or presence of non-ideal connections at the binder interface. On the basis of such identifications, detailed diagnostic analyses or optimization features can be launched selectively on the affected lines, or field interventions can be set up at the binder level if required.

It is an object of embodiments of the present invention to identify clusters of lines presenting similar trends in the evolutions, over time, of some of their physical characteristics.

The advantage of the present invention may be understood by considering the response of lines to their noise environment. A given binder is impacted by the presence of external and/or internal noise. Some of its lines, which are unbalanced for any reason, respond strongly and coherently to variations in their noise environment over time. In another part of the binder network, different noise conditions occur and other virtual binders of coupled lines can therefore be identified. The purpose of this solution is then the identification of virtual binders of coupled lines to get knowledge about their topology and to infer conclusions about the state of the physical binder network branches.

Starting from an estimated scalar value representing the background noise level for a given line, detection of coherent trends between lines is performed by detecting similarities in curves expressing the evolution of this scalar value in function of time, i.e. n[t]. Examples of such curves are presented in FIG. 2.

As inputs, this solution takes the scalar noise level evolution across time of each line of a given CO, i.e. n[l, t], with l and t being respectively the line and the time index.

The architecture of the algorithm used in the present invention follows the typical pattern recognition algorithm functional chain and is typically divided into four main parts:
Input preprocessing
Feature extraction
Pattern recognition
Confidence estimation During feature extraction, low pass filtering as well as normalization between lines in the statistical sense may be computed respectively to generalize and to give to each sample of the time window an equivalent weight. Such processing extracts meaningful features able to correctly feed the following part of the algorithm by optimizing the space and distances between patterns.

In the pattern recognition part, combinations of correlation between features and correlations of the significant sign variations of their first derivative are performed, typically producing a distance matrix expressing the level of similitude estimated between the lines of a given CO. From the distance matrix, classical clustering techniques such as hierarchical clustering can be used to identify family of curves presenting the same trends in order to gather them and to separate them from others. Finally, statistics on clustered input data, such as the mean noise level, may be estimated.

An optional additional part of the algorithm provides an estimation of the reliability of each cluster. This is carried out by comparing the spread of each cluster with respect to its distance to others. In other words, it quantifies the similarities between clustered features with respect to similarities of unclustered features.

As outputs, ID of clustered lines (ports) as well as clustered data statistics are returned.

FIG. 1 illustrates an exemplary topology of a wireline network in which the present invention may be used. The network portion shown is served by a central office 100, from which a number of lines originate. In FIG. 1, a limited number of these lines are shown, without loss of generality. Some of these lines are identified by reference numerals 101, 102, 103 and 104. It is common in telephony networks to combine lines, at least over a part of their length, in binders. Without loss of generality, some of the lines illustrated in FIG. 1 are shown as belonging to separate binders 111, 112, 113. It is generally observed that lines belonging to the same physical binder exhibit stronger cross-talk coupling than lines belonging to different physical binders. The present invention generalizes the concept of binders to so called 'virtual binders', which group sets of lines that react coherently to external stimuli. In FIG. 1, two such virtual binders are shown; the first one identified by reference numeral 120, comprising physical binders 111 and 112, and the second one coinciding with physical binder 113. In the illustrated exemplary network, the grouping of physical binders 111 and 112 into virtual binder 120 is due to physical damage in section 120 of the network, which causes the affected lines to be particularly susceptible to external disturbances, and to exhibit coherent reactions thereto. A possible physical situation that might lead to such behavior would be damage to the insulation of physical binders 111 and 112, which allows moisture, illustrated in FIG. 1 as raincloud 150, to infiltrate into said binders.

Figure 2:
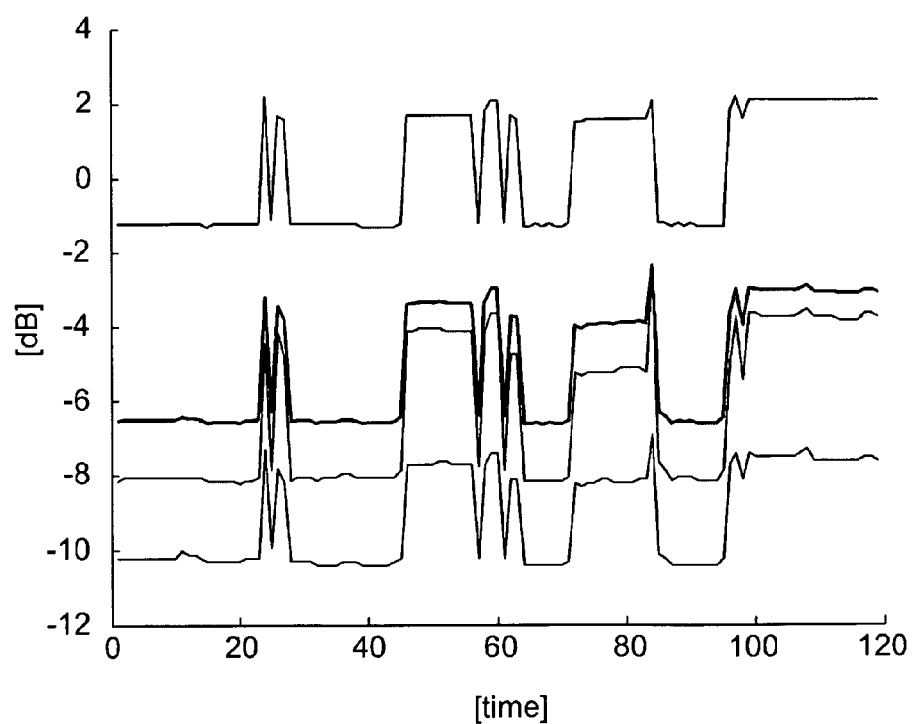
FIG. 2 illustrates noise value trends obtained from a number of lines.

FIG. 2 illustrates three sets of noise value samples, obtained over a period represented by 120 samples, from three distinct lines, which may be decided to belong to a common virtual binder. A first trend line shown at the top of FIG. 2 illustrates a series of noise value samples, the absolute value of which ranges between approximately −2 dB and approximately +2 dB. A second series of noise value samples is presented near the bottom of FIG. 2 and comprises noise value samples of which the absolute value ranges between approximately −8 dB and approximately −4 dB. A third series of noise value samples is shown at the bottom of FIG. 2 and comprises noise value samples of which the absolute value ranges between approximately −10 dB and approximately −8 dB. All values are referenced to a common signal power level which may be chosen arbitrarily. In addition, FIG. 2 illustrates in bold a series of values that represent the average of the three aforementioned noise value sample series. As will be described in more detail below, correlations may be determined between features of the various individual noise value sample series.

Figure 3:
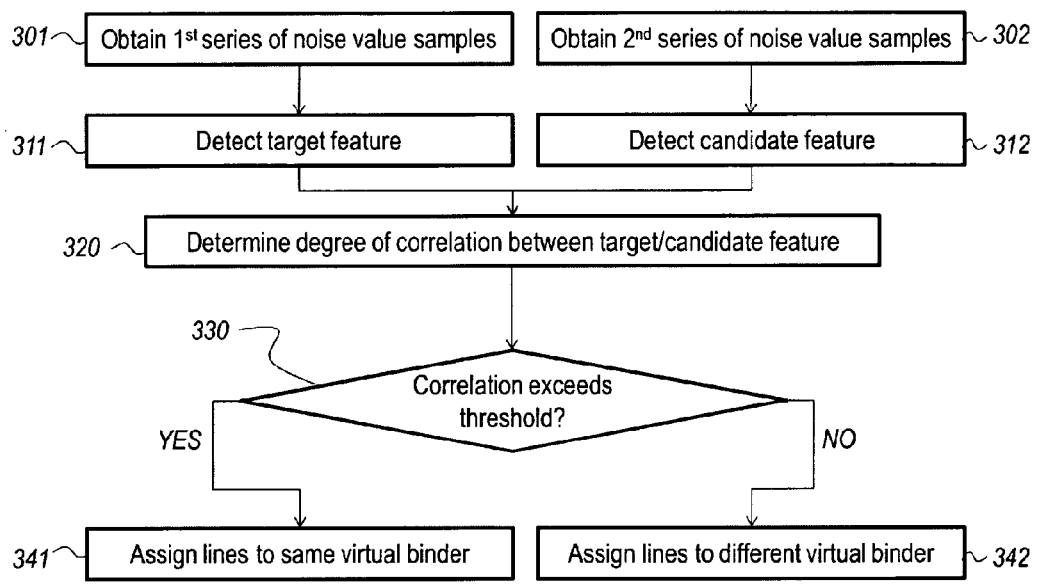
FIG. 3 presents a flow chart illustrating an embodiment of the method according to the present invention.

FIG. 3 illustrates in more detail an embodiment of the method according to the present invention. Without loss of generality, FIG. 3 illustrates a method to group two individual lines into either one common virtual binder, or two different virtual binders, depending on the degree of similarity in their respective reactions to external stimuli. It should be noted that although the various steps are presented in FIG. 3 in a particular order, this order is used for illustrative purposes only, and should not be considered to be an essential element of the invention, unless it is specified otherwise. In a first pair of steps 301, 302, series of noise value samples are obtained for each targeted line of the wireline network portion to which the method is being applied. Noise values are preferably scalar values representing an average noise power density in a portion of the spectrum that is relevant to the transmission technology used in the targeted wireline network. For instance, in an ADSL network, the noise value may be assessed in the spectral band between DC and 1.1 MHz. Similarly, in a VDSL network, the noise value may be assessed in a spectrum between 138 kHz, and 12 MHz. The skilled person will understand that various different transmission technologies use different parts of the spectrum for their signals, and that the noise value should be assessed accordingly. In a step not shown in FIG. 3, the obtained noise value samples may be preprocessed to suppress a DC component present therein, and to normalize the high frequency energy to make the curves obtained from different lines more easily comparable. In a subsequent pair of steps 311, 312, comparable features are detected in the preprocessed noise value sample series. For clarity purposes, a feature selected as suitable for comparison, obtained from the first line, is designated 'target feature'. A feature selected from the second sample series as suitable for being compared with the target feature, is designated 'candidate feature'. In step 320, the degree of correlation between the target feature and the candidate feature is determined in order to assess the extent to which the first line and the second line react similarly to external stimuli. The correlation may be determined by any suitable mathematical or statistical method, known to people skilled in the art. If the correlation exceeds a predetermined threshold, both lines under detection will be assigned to the same virtual binder 341, and if the correlation does not exceed said threshold, both lines will be assigned to different virtual binders 342. The threshold will be set at an appropriate level, taking into account the correlation algorithm selected in 320.

Figure 4:
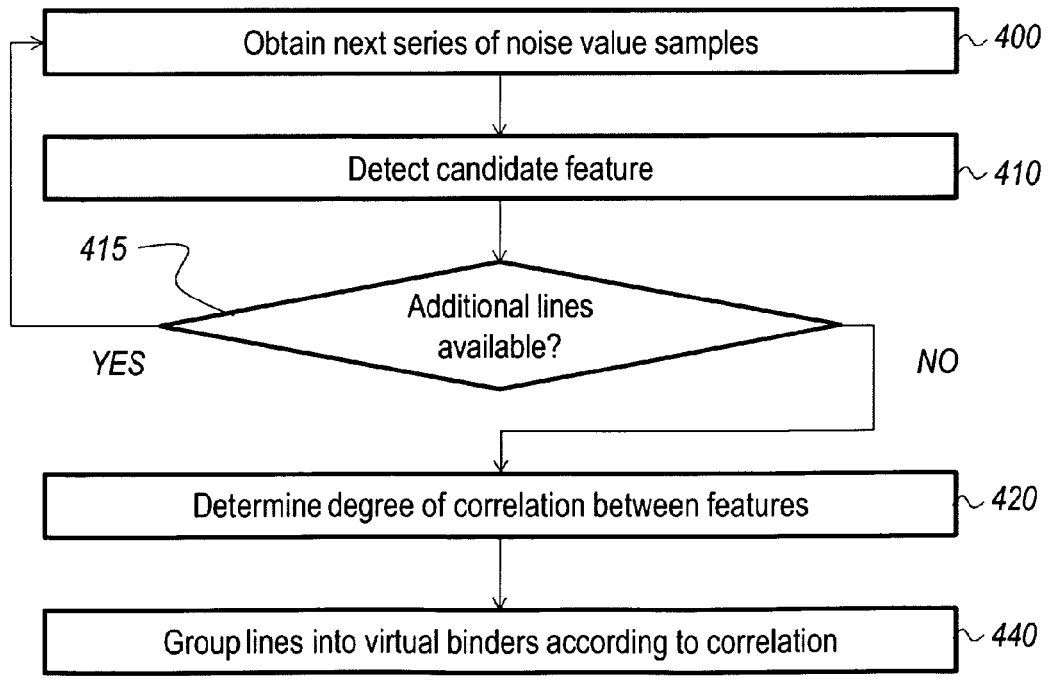
FIG. 4 presents a flow chart illustrating a further embodiment of the method according to the present invention.

FIG. 4 illustrates a generalization of the embodiment illustrated in FIG. 3, which explicitly includes the application of the principles underlying the present invention, to an undetermined number of lines. In a first step 400, which logically corresponds to the first pair of steps 301, 302 from FIG. 3, a series of noise value samples of a target line is obtained. In a subsequent step 410, which logically corresponds to the second pair of steps 311, 312 of FIG. 3, a feature suitable for comparison is detected in the obtained noise value sample series. As before, appropriate preprocessing of the noise value sample series (not shown) may take place before step 410. Step 415 is a decision step, which causes the algorithm to iterate over a selected set of lines under detection, which may comprise any number of lines available in the wireline network. In step 420, which logically corresponds to step 320 illustrated in FIG. 3, a degree of correlation between the detected features is determined. The correlations may be determined pairwise between each pair of lines, leading for N lines to N(N−1)/2 correlations or distance calculations. In a specific embodiment, the mutual correlations are determined in the form of a distance matrix. Once the correlations are known, the different lines may be grouped into virtual binders 440, by assigning highly intercorrelated lines to the same virtual binder. In a specific embodiment, a clustering algorithm may be applied to a distance matrix, to identify clusters representing different virtual binders.

By generalization, the present invention thus provides a method for clustering a plurality of lines into virtual binders, the method comprising obtaining respective series of noise value samples pertaining to each line of said plurality of lines, detecting a temporally substantially coinciding feature in said respective series of noise value samples, determining pairwise degrees of correlation between the respective detected features of each pair of lines of said plurality of lines, and clustering said plurality of lines into a number of virtual binders by the rule that lines whose features have a mutual degree of correlation exceeding a certain predetermined correlation value are assigned to a same virtual binder. Equivalently, the present invention provides a method for clustering a plurality of lines into virtual binders, the method comprising obtaining respective series of noise value samples pertaining to each line of said plurality of lines, detecting a temporally substantially coinciding feature in said respective series of noise value samples, determining pairwise distances between the respective detected features of each pair of lines of said plurality of lines, and clustering said plurality of lines into a number of virtual binders by the rule that lines whose features have a mutual distance below a certain predetermined maximum distance are assigned to a same virtual binder.

Figure 5:
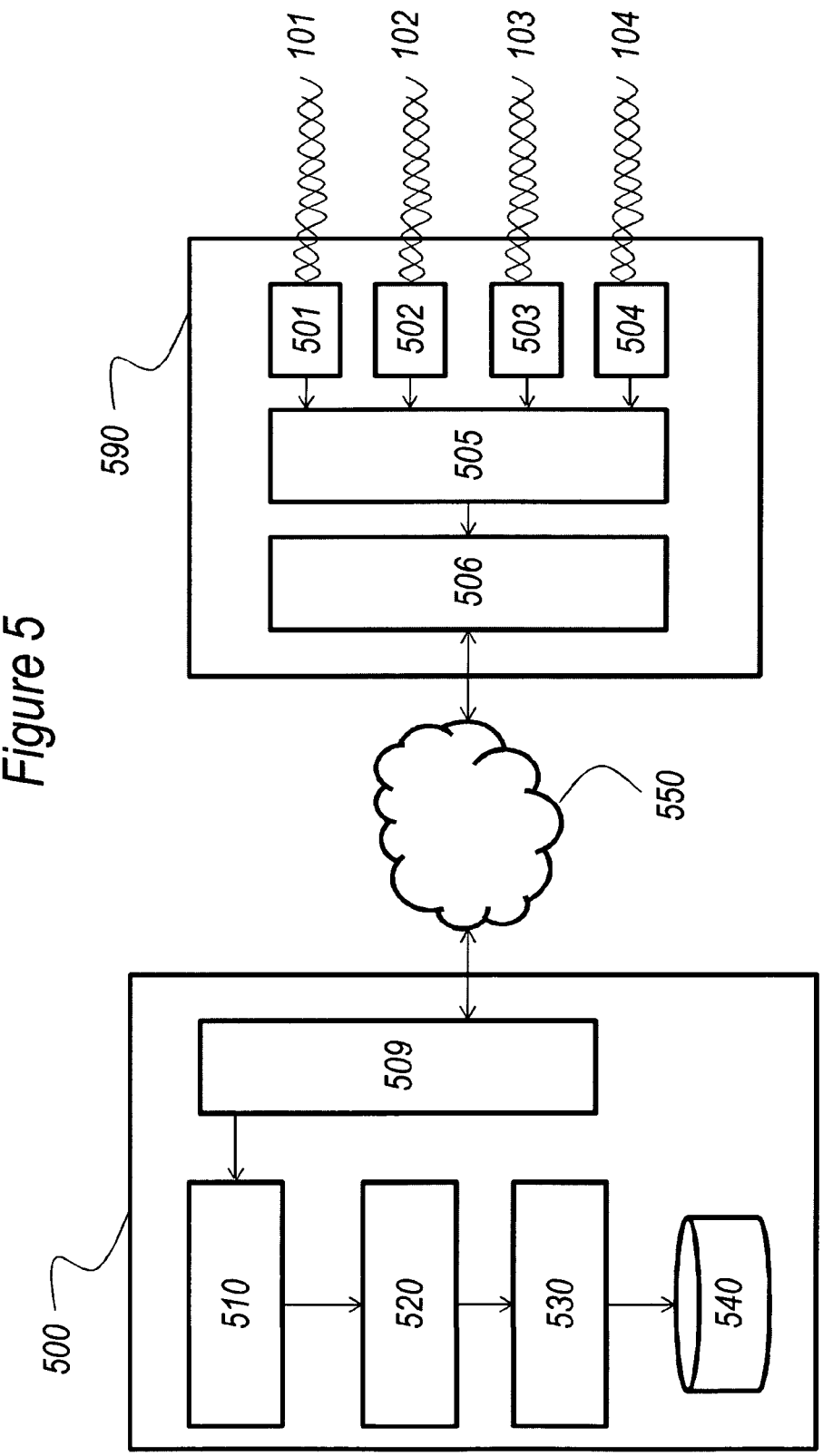
FIG. 5 presents a block diagram illustrating an embodiment of the system according to the present invention.

FIG. 5 illustrates an embodiment of a device according to the present invention, which is suitable for applying the method described above, embedded in a networked system. Network node 590, preferably an access node, is illustrated as serving four twisted pair lines 101-104, which logically correspond to lines designated by the same numerals in FIG. 1. Although only four lines are illustrated, this is done for clarity purposes only, and does not imply any limitation to the number of lines that the network node of the present invention may connect to. For each line 101-104, the network node 590 of the invention comprises noise measurement means 501-504, configured to obtain series of noise value samples pertaining to the respective line. Obtaining the noise value samples takes place according to the methods known in the art. In particular, this obtaining may include actual measuring of the noise, or retrieving a measured value from the physical-layer device servicing the line. Accordingly, the measurement means may for instance retrieve noise values pertaining to the downstream channel from a piece of customer premises equipment using a management protocol. An optional preprocessing unit 505 may apply appropriate preprocessing, such as compressing, time-averaging, etc., to the noise value samples, before handing them off to the transmission means 506.

The transmission means 506 of the network node communicates with the receiving means 507 of the device via network 550. Network 550 may be a point-to-point link, or any more complex network topology. Preferably, network 550 operates according to the Internet Protocol (IP). Particularly preferably, the exchange of information between network node 590 and device 500 takes place by means of a management protocol such as the Simple Network Management Protocol (SNMP).

The device 500 according to the invention comprises a receiving means 507, which receives the respective series of noise value samples. In the illustrated example, the device 500 receives these series, optionally preprocessed, from the network node 590. A feature extraction unit 510 is operatively connected to said receiving means, and is configured to detect features suitable for being compared in the various respective series. Features suitable to be compared are features which have substantially the same temporal extent, and which preferably present a similar high level trend, such as the presence of a temporally coinciding step in sample values, which exceeds a predetermined threshold. Device 500 further comprises a correlation unit 520, operatively connected to feature extraction unit 510, which is configured to determine a degree of correlation between the different features detected by feature extraction unit 510 as described above. Next, a virtual binder assignment unit 530 is configured to assign the various lines 101-104, to various virtual binders according to their mutual degrees of correlation determined by the correlation unit 520, in accordance with the principles explained above in the context of FIG. 3 and FIG. 4. The virtual binder assignments may be presented to an operator of the network node via a suitable man-machine interface, or stored in an internal database 540, for use in subsequent network management decisions and operations.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the figures, including any functional blocks labeled as "processors" or "units", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures. are conceptual only. Their function may be carried out through the operation of program logic, through dedicated logic, through the interaction of program control and dedicated logic, or even manually, the particular technique being selectable by the implementer as more specifically understood from the context.

The invention claimed is:

1. A method for clustering lines of a wireline network in a number of virtual binders, said method comprising:
    obtaining a first series of noise value samples pertaining to a first line of said wireline network and a second series of noise value samples pertaining to a second line of said wireline network, wherein noise value samples of said first series and noise value samples of said second series correspond to pairwise substantially synchronous sampling moments;
    detecting a target feature in said first series;
    detecting a candidate feature in said second series, said candidate feature substantially coinciding with said target feature in its temporal extent;
    determining a degree of correlation between said candidate feature and said target feature; and
    assigning said first line and said second line to a first virtual binder if said degree of correlation exceeds a predetermined threshold value, and assigning said first line and said second line to said first virtual binder and a second virtual binder, respectively, if said degree of correlation does not exceed said predetermined threshold value.

2. The method of claim 1, further comprising:
    selecting said first line and said second line of said wireline network on the basis of the occurrence of substantially synchronous step transitions in said first series of noise value samples and said second series of noise value samples, wherein said step transitions have a magnitude exceeding a predetermined threshold magnitude.

3. The method of claim 1, wherein said determining comprises correlating corresponding subsets of said first and said second series of noise value samples.

4. The method of claim 1, wherein said determining comprises correlating corresponding series of first derivative values derived from said first and said second series of noise value samples.

5. The method of claim 1, further comprising, for any additional line of said wireline network:
    obtaining an additional series of noise value samples pertaining to said additional line, wherein sampling times of noise value samples of said additional series substantially correspond to said sampling moments;
    detecting an additional feature in said additional series, said additional feature substantially coinciding with said target feature in its temporal extent;
    determining an additional degree of correlation between said additional feature and said target feature; and
    assigning said additional line to said first virtual binder if said additional degree of correlation exceeds said predetermined threshold value.

6. The method of claim 5, further comprising:
    determining a further degree of correlation between said additional feature and said candidate feature, and assigning said additional line to said second virtual binder if said further degree of correlation exceeds said predetermined threshold value.

7. The method of claim 5, further comprising:
    producing a distance matrix representing degrees of correlation between each of said first feature, said second feature, and said additional feature of said any additional line, wherein said assigning of said first line, said second line, and said any additional line to respective virtual binders is performed by applying a clustering algorithm to said distance matrix.

8. A device for clustering lines of a wireline network in a number of virtual binders, said device comprising:
    receiving means configured to retrieve a first series of noise value samples pertaining to a first line among said number of lines and a second series of noise value samples pertaining to a second line among said number of lines;
    a feature extraction unit, operatively connected to said receiving means, said feature extraction unit being configured to detect a target feature in said first series and to detect a candidate feature in said second series;
    a correlation unit, operatively connected to said feature extraction unit, said correlation unit being configured to determine a degree of correlation between said candidate feature and said target feature; and
    a virtual binder assignment unit, configured to assign said first line and said second line to a first virtual binder if said degree of correlation exceeds a predetermined threshold value, and to assign said first line and said second line to said first virtual binder and a second virtual binder, respectively, if said degree of correlation does not exceed said predetermined threshold value.

9. The device of claim 8, further comprising:
    a selection unit, operatively connected to said receiving means, said selection unit being configured to select said first line and said second line from among said number of lines on the basis of the occurrence of substantially synchronous step transitions in said first series of noise value samples and said second series of noise value samples, wherein said step transitions have a magnitude exceeding a predetermined threshold magnitude.

10. The device of claim 8, wherein said correlation unit is configured to correlate corresponding subsets of said first and said second series of noise value samples.

11. The device of claim 8, wherein said correlation unit is configured to correlate corresponding series of first derivative values derived from said first and said second series of noise value samples.

12. The device of claim 8, wherein said receiving means is further configured to retrieve an additional series of noise value samples pertaining to an additional line, wherein sampling times of noise value samples of said additional series substantially correspond to said sampling moments;

wherein said feature extraction unit is further configured to detect an additional feature in said additional series, said additional feature substantially coinciding with said target feature in its temporal extent;

wherein said correlation unit is further configured to determine an additional degree of correlation between said additional feature and said target feature; and wherein said virtual binder assignment unit is further configured to assign said additional line to said first virtual binder if said additional degree of correlation exceeds said predetermined threshold value.

13. The network device of claim 12, wherein said correlation unit is further configured to determine a further degree of correlation between said additional feature and said candidate feature; and wherein said virtual binder assignment unit is further configured to assign said additional line to said second virtual binder if said further degree of correlation exceeds said predetermined threshold value.

14. A system comprising the device of claim 8 and an access node connected thereto, wherein said access node is connectable to said first line and said second line; said access node comprising a first noise measurement means configured to obtain said first series of noise value samples pertaining to said first line, a second noise measurement means configured to obtain a second series of noise value samples pertaining to said second line, and transmission means configured to transmit said first series of noise value samples and said second series of noise value samples to said device.

15. The system of claim 14, wherein said access node further comprises a preprocessing unit, operatively connected to said first and second measurement means and configured to generate preprocessed noise values, wherein said transmission means is adapted to transmit said preprocessed noise values to said device.

* * * * *